United States Patent [19]
Headley

[11] Patent Number: 5,487,559
[45] Date of Patent: Jan. 30, 1996

[54] AIR BAG INFLATOR WITH PRESSURE SENSOR

[75] Inventor: Paul S. Headley, Mesa, Ariz.

[73] Assignee: TRW Inc., Lyndhurst, Ohio

[21] Appl. No.: 305,064

[22] Filed: Sep. 13, 1994

[51] Int. Cl.$^6$ ..................................... B60R 21/26
[52] U.S. Cl. ................ 280/735; 280/737; 280/741
[58] Field of Search ........................ 280/737, 736, 280/741, 735; 200/83 P; 102/223, 530, 531; 422/164, 165, 166

[56] References Cited

U.S. PATENT DOCUMENTS

| | | | |
|---|---|---|---|
| 3,450,414 | 6/1969 | Kobori | 280/735 |
| 3,495,675 | 2/1970 | Hass et al. | 280/735 |
| 3,771,121 | 11/1973 | Lohr | 340/451 |
| 3,850,039 | 11/1974 | Brakebill | 280/741 |
| 3,869,143 | 3/1975 | Merrell | 280/737 |
| 3,944,769 | 3/1976 | Wagner | 280/741 |
| 4,049,935 | 9/1977 | Gruber | 200/83 P |
| 5,033,772 | 7/1991 | Franton et al. | 280/737 |
| 5,296,659 | 3/1994 | Potts et al. | 280/736 |
| 5,331,126 | 7/1994 | Dwyer et al. | 280/736 |
| 5,362,100 | 11/1994 | Werbelow | 280/736 |

FOREIGN PATENT DOCUMENTS

| | | | |
|---|---|---|---|
| 2855582 | 7/1976 | Germany | 200/83 P |
| 63-159156 | 7/1988 | Japan | 280/736 |

*Primary Examiner*—Karin L. Tyson
*Attorney, Agent, or Firm*—Tarolli, Sundheim & Covell

[57] ABSTRACT

An air bag inflator (20) includes gas stored at or above a predetermined pressure in a chamber (24) in a container (22). An initiator (10) connected with the container (22) is exposed to the pressure of the gas stored in the chamber (24). A closure can (120) of the initiator (10) includes an electrically conductive sensor portion (140) which is spaced apart from an electrically conductive contact can (200) when the pressure in the chamber (24) is at or above the predetermined pressure. If the pressure in the chamber (24) drops below the predetermined pressure, the sensor portion (140) moves into electrical contact with the contact can (200). The engagement of the sensor portion (140) with the contact can (200) completes an electrical circuit to provide an indication of low pressure in the inflator (20).

23 Claims, 3 Drawing Sheets

AIR BAG INFLATOR WITH PRESSURE SENSOR

BACKGROUND OF THE INVENTION

1. Technical Field

The present invention relates to an apparatus for inflating a vehicle occupant restraint, and particularly relates to an initiator which is used with an air bag inflator and which, when actuated, causes stored gas in the inflator to be released to inflate an air bag.

2. Description of the Prior Art

It is known to protect a vehicle occupant by an air bag that is inflated in the event of sudden vehicle deceleration such as occurs in a vehicle collision. The air bag is inflated by inflation fluid from an inflator and restrains movement of the vehicle occupant during the collision. The inflation fluid may include gas stored in a container in the inflator. An electrically actuatable initiator in the inflator causes the container to open and release the stored gas to inflate the air bag.

If the pressure of the stored gas in the inflator drops below a predetermined pressure, the air bag may not inflate properly. It is known to monitor the pressure of stored gas in an inflator with a pressure sensor.

SUMMARY OF THE INVENTION

The present invention is an apparatus for inflating an inflatable vehicle occupant restraint. The apparatus includes a container defining a chamber and inflation fluid in the chamber at a pressure at least as great as a predetermined pressure. An initiator is connected with the container for, when actuated, causing the container to open to enable flow of inflation fluid into the inflatable vehicle occupant restraint to inflate the inflatable vehicle occupant restraint. A portion of the initiator is exposed to the pressure of the inflation fluid in the chamber. The initiator includes pressure sensing means for sensing a decrease in the pressure in the chamber to a pressure below the predetermined pressure.

The initiator includes an electrically conductive first member electrically connected with vehicle circuitry. The initiator also includes an electrically conductive second member electrically connected with vehicle circuitry and having a sensor portion disposed adjacent to the first member. The initiator includes means for transmitting the pressure of the inflation fluid in the chamber to the sensor portion of the second member. The sensor portion of the second member is movable relative to the first member from a first condition to a second condition. In the first condition, the sensor portion is spaced apart from the first member, and the pressure in the chamber is at least as great as the predetermined pressure. In the second condition, the sensor portion is in engagement with the first member, and the pressure in the chamber is below the predetermined pressure.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT OF THE INVENTION

Figure 1:
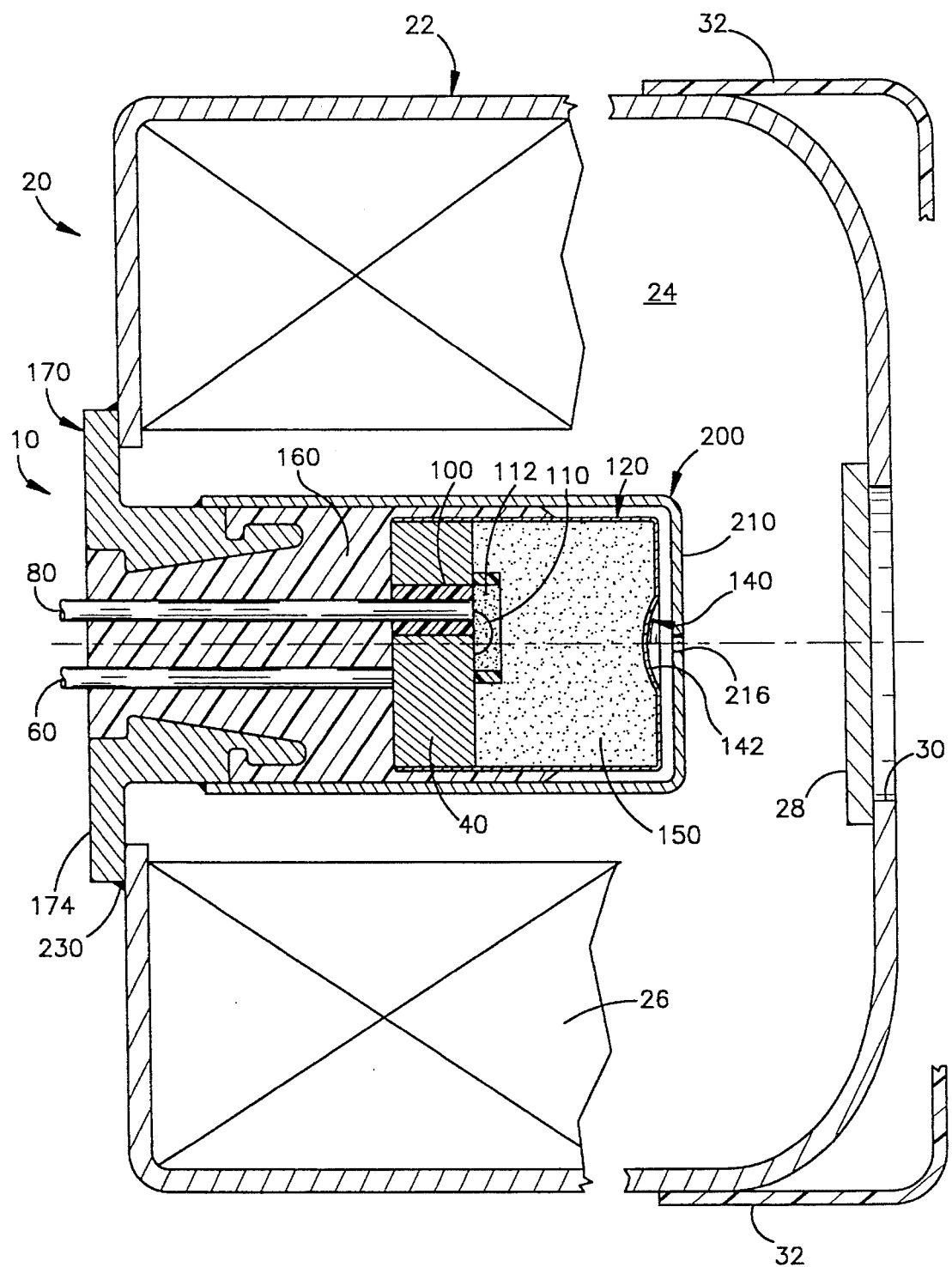
FIG. 1 is a sectional view of an inflator and an initiator which are constructed in accordance with the present invention.

The present invention relates to an apparatus for inflating a vehicle occupant restraint and preferably to an air bag inflator. The present invention is applicable to various inflator constructions. For example, the invention can be applied to inflators which include a stored gas or inflators which include a stored gas and combustible gas generating material to heat and augment the stored gas. As representative of the present invention, FIG. 1 illustrates an air bag inflator 20.

The inflator 20 includes a container 22. The container 22 defines a chamber 24 within the inflator 20. A body of pyrotechnic material indicated schematically at 26 is disposed within the chamber 24. A quantity of an inflation fluid, preferably a gas such as argon or nitrogen, is stored under pressure in the chamber 24.

An initiator 10 projects into the chamber 24 in the container 22 and is exposed to the gas stored in the chamber. A diaphragm or burst disk 28 closes an opening 30 in the container 22 to maintain the pressure of the gas stored in the container. When the initiator 10 is actuated, the inflator 20 is actuated, and gas from the container 22 flows through the opening 30 into an air bag 32 to inflate the air bag to restrain a vehicle occupant.

The initiator 10 (FIG. 2) includes a header 40 which is a generally cylindrical metal block. The header 40 has a cylindrical outer side surface 42 and parallel, radially extending, circular inner and outer end surfaces 44 and 46. An inner surface 48 defines a cylindrical opening 50 extending axially through the header 40 between the end surfaces 44 and 46.

A first conductor pin or terminal 60 (FIG. 2) is connected with the header 40. The first terminal 60 is a metal pin which extends parallel to a central axis 62 of the initiator 10. An inner end portion 64 of the first terminal 60 is welded to the outer end surface 46 of the header 40. An outer end portion 66 of the first terminal 60 extends away from the header 40 in a direction parallel to the axis 62.

A second conductor pin or terminal 80 extends parallel to the first terminal 60. An inner end portion 82 of the second terminal 80 extends axially through the opening 50 in the header 40. An inner end surface 84 of the second terminal 80 is coplanar with the inner end surface 44 of the header 40. An outer end portion 86 of the second terminal 80 extends away from the header 40 in a direction parallel to the axis 62.

An insulator 100 made from an electrically non-conductive material encircles the inner end portion 82 of the second terminal 80. The insulator 100 fills the annular space between the inner end portion 82 of the second terminal 80 and the inner surface 48 of the header 40. The insulator 100 electrically insulates between the header 40 and the inner end portion 82 of the second terminal 80.

A bridgewire 110 extends between the inner end surface 84 of the second terminal 80 and the inner end surface 44 of the header 40. The bridgewire 110 is a thin metal resistance wire which heats up and generates thermal energy when an electric current of a predetermined magnitude passes through the bridgewire.

The bridgewire 110 extends through a portion of an ignition charge 112. The ignition charge 112 is a pyrotechnic material, preferably zirconium potassium perchlorate, which auto-ignites upon the application of sufficient thermal energy. The ignition charge 112 is enclosed in a charge holder 114 which is mounted on the inner end surface 44 of the header 40.

A one-piece inner cover or closure can 120 is welded to the header 40. The closure can 120 is a cup-shaped electrically conductive member preferably made from drawn stainless steel. An axially extending cylindrical side wall 126 of the closure can 120 overlies the outer side surface 42 of the header 40. The side wall 126 is welded at a continuous circumferential weld location 124 to the header 40. The side wall 126 has parallel inner and outer side surfaces 128 and 130.

A radially extending circular end wall 136 of the closure can 120 includes an annular, generally planar ring portion 138 which is connected with the side wall 126 of the closure can. The ring portion 138 of the closure can 120 is spaced from but extends generally parallel to the inner end surface 44 of the header 40. The end wall 136 of the closure can 120 also includes a sensor portion 140 which, in the preferred embodiment, is a spherical segment of the end wall. The sensor portion 140 is disposed radially inward of the ring portion 138 and is centered on the axis 62. When viewed in plan (from the top as viewed in FIG. 2), the sensor portion 140 has a circular configuration. The sensor portion 140 has an outer side surface 142 and an inner side surface 144.

The end wall 136 of the closure can 120 can flex or bend at the circular outer periphery 146 of the sensor portion 140 to allow the sensor portion to move in an over-center manner as described below, between the condition shown in FIGS. 2 and 3A and the condition shown in FIG. 3B. The closure can 120 is manufactured so that, prior to connection of the initiator 10 with the inflator 20 and pressurization of the chamber 24, the sensor portion 140 of the closure can 120 is in the condition shown in FIG. 3B. That is, the sensor portion 140 has a center of curvature which is disposed below (as viewed in FIG. 3B) a reference plane 148 which is coplanar with the ring portion 138 of the end wall 136 of the closure can 120. The sensor portion 140 is bowed upward from the plane of the ring portion 138 of the end wall 136 of the closure can 120, in a direction away from the header 40.

An output charge 150 (FIG. 2) of the initiator 10 is enclosed in the closure can 120. The output charge 150 is a pyrotechnic material which, upon being ignited by the ignition charge 112, generates hot gases to ignite the pyrotechnic material 26 (FIG. 1) in the inflator 20. The output charge 150 is preferably a powder mixture of 50% $BKNO_3$ and 50% titanium subhydride potassium perchlorate.

A body of injection molded plastic material 160 (FIG. 2) encloses the terminals 60 and 80 below the header 40. The plastic material 160 also extends axially upward (as viewed in FIG. 2) over a portion of the side wall 126 of the closure can 120. Adjacent the outer end portions 66 and 86 of the terminals 60 and 80, the plastic material 160 is interlocked with an adaptor 170. The adaptor 170, which is made from a weldable metal such as stainless steel, has an annular main body portion 172. An annular flange 174 extends radially outward from the lower end (as viewed in FIG. 2) of the main body portion 172. The plastic material 160 supports the assembly of the header 40 and the parts supported on it, such as the closure can 120 and the terminals 60 and 80, on the adaptor 170.

An outer cover or contact can 200 is connected with the adaptor 170. The contact can 200 is disposed outside of and covers the closure can 120. The contact can 200 is a cup-shaped, electrically conductive member preferably made from drawn stainless steel. The contact can 200 has an axially extending cylindrical side wall 202 with parallel inner and outer side surfaces 204 and 206. The side wall 202 of the contact can 200 is spaced radially outward from the side wall 126 of the closure can 120. The side wall 202 is welded to the main body portion 172 of the adaptor 170 at a continuous circumferential weld location 208.

A radially extending circular end wall 210 of the contact can 200 is formed as one piece with the side wall 202. The end wall 210 has parallel inner and outer side surfaces 212 and 214. The end wall 210 is spaced apart from and extends generally parallel to the ring portion 138 of the end wall 136 of the closure can 120. An axially extending, circular opening 216 is formed in the end wall 210 of the contact can 200. The opening 216 is disposed adjacent to the sensor portion 140 of the closure can 120.

The initiator 10, once assembled, is attached to the container 22 (FIGS. 1 and 2), preferably by welding. The flange 174 of the adaptor 170 is continuously welded to the container 22 at a circumferential weld location 230. The initiator 10 is thereby secured in position in the inflator 20. The terminals 60 and 80 of the initiator 10 are connected with vehicle circuitry (not shown) which includes a collision sensor, such as a deceleration sensor, and a power source, such as the vehicle battery. It should be noted that the initiator 10 can be secured to the container 22 by other means. For example, it is contemplated that the adaptor 170 and the container 22 may have complementary threaded portions which would permit the adaptor and container to be screwed together.

The initiator 10 is connected with the inflator 20 prior to pressurization of the chamber 24 in the container 22. The chamber 24 is then filled with the inflation fluid, which is preferably a gas. When the pressure of the gas in the chamber 24 reaches a predetermined pressure, typically in the range of about 2,500 psi to 5,000 psi, the container 22 is closed. The predetermined pressure is a pressure which is selected to be sufficient to cause the air bag 32 to inflate in the desired manner when the inflator 20 is actuated.

During the pressurization of the chamber 24 in the container 22, the initiator 10 is exposed to the pressure of the gas stored in the chamber. The gas in the chamber 24 contacts the outer surface 214 of the end wall 210 of the contact can 200 and flows through the opening 216 in the end wall 210. The gas thus contacts the outer surface 142 of the sensor portion 140 of the closure can 120.

When the pressure of the gas in the chamber 24 reaches the predetermined pressure, the end wall 136 of the closure can 120 flexes at the peripheral edge 146 of the sensor portion 140. The sensor portion 140 moves in an over-center manner, against its preset bias, from the condition shown in FIG. 3B to the condition shown in FIGS. 2 and 3A. The sensor portion 140 moves or pops downward from the plane of the ring portion 138 of the end wall 136 of the closure can 120, that is, in a direction toward the header 40 and out of engagement with the end wall 210 of the contact can 200. The sensor portion 140 in this condition has a center of curvature which is disposed above the reference plane 148.

Figure 2:
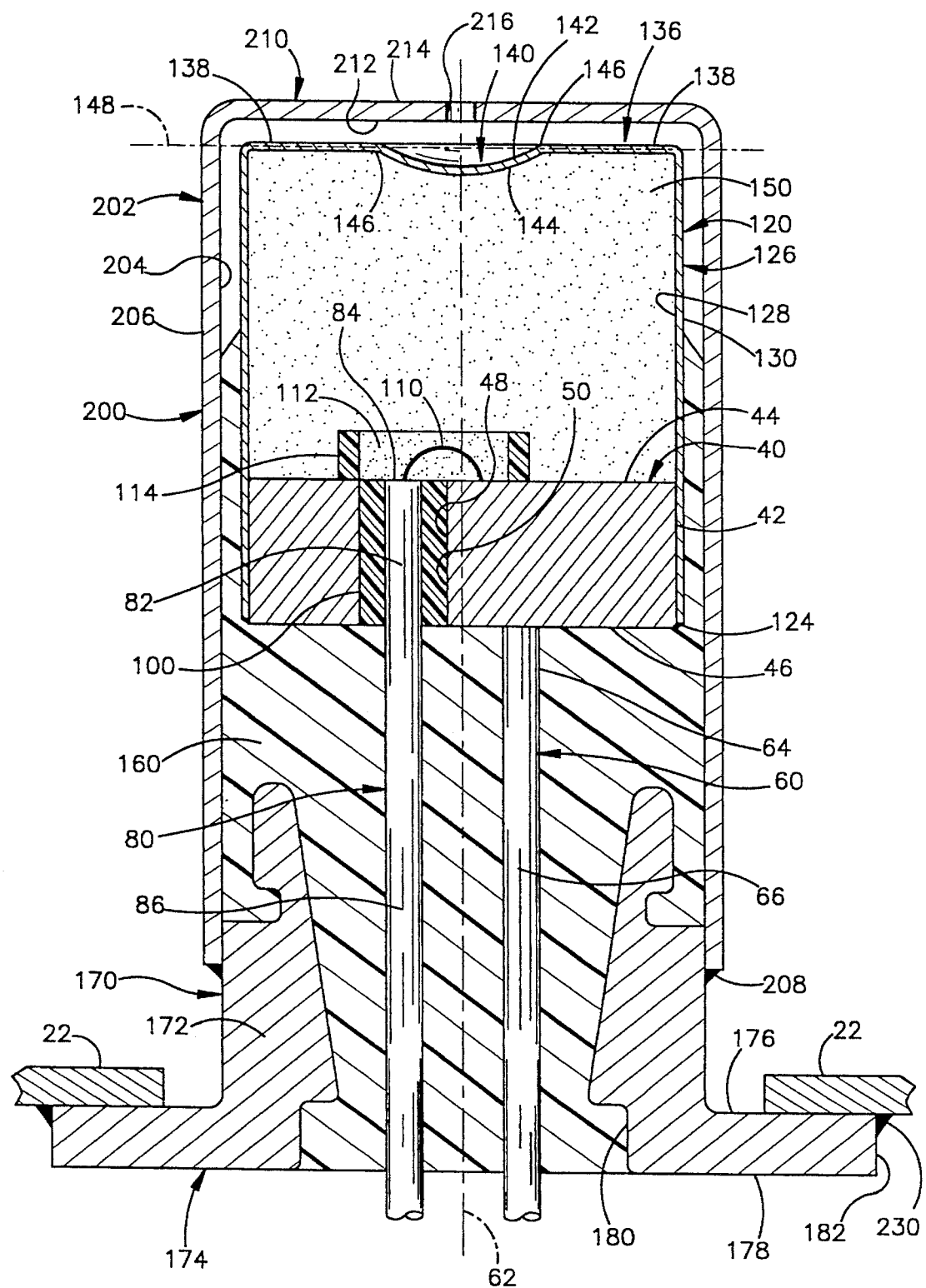
FIG. 2 is an enlarged sectional view of the initiator of FIG. 1.
Figure 3A:
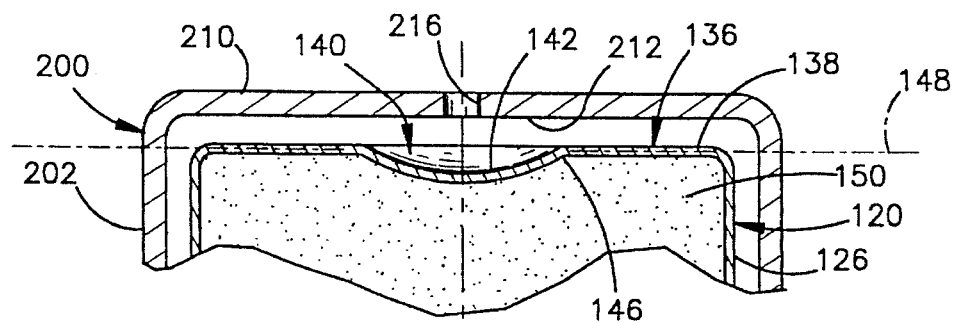
FIG. 3A is view showing a portion of the initiator of FIG. 2 in a first condition.
Figure 3B:
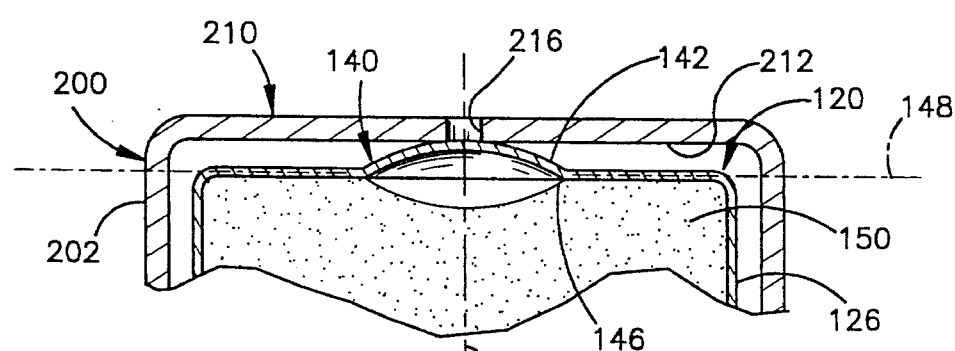
FIG. 3B is a view similar to FIG. 3A and showing the initiator of FIG. 2 in a second condition.

The characteristics of the closure can 120 are selected so that the sensor portion 140 moves from the condition shown in FIG. 3B to the condition shown in FIGS. 2 and 3A only when the pressure on the outer surface 142 of the sensor portion is equal to or in excess of the predetermined pressure. These characteristics include the material from which the closure can 120 is made, the thickness of the end wall 136 of the closure can, and the amount of force needed to overcome the bias of the sensor portion 140.

When the gas pressure in the inflator is at or above the predetermined pressure, the sensor portion 140 of the initiator 10 is in the condition shown in FIGS. 2 and 3A and is spaced apart from the end wall 210 of the contact can 200. There is no electrical contact between the closure can 120 and the contact can 200. Accordingly, electric current can not flow between the closure can 120 and the contact can 200. Thus, there is no complete electric circuit through the initiator 10 between (a) the first terminal 60 and (b) the vehicle ground indicated schematically at 230 (FIG. 4) to which the container 22, the adaptor 170, and the contact can 200 are electrically connected. A monitor circuit indicated schematically at 232 (FIG. 4) accordingly reads that the pressure of the gas stored in the chamber 24 in the inflator 20 is above the predetermined pressure. As a result, a warning light (not shown) on the vehicle instrument panel, which is electrically connected with the output of the monitor circuit 232, is not lit.

Upon the occurrence of a collision involving the vehicle in which the inflator 20 is mounted, the collision sensor (not shown) closes an electrical circuit. An electric current flows through the terminals 60 and 80 to the bridgewire 110. The bridgewire 110 heats up and ignites the ignition charge 112. The ignition charge 112 ignites the output charge 150. The output charge 150 ignites the pyrotechnic material 26 in the container 22. Ignition of the pyrotechnic material 26 generates heat to increase the pressure of the gas in the chamber 24. When the pressure reaches a predetermined level, the burst disk 28 of the container 22 ruptures to release the gas stored in the container 22. The gas stored in the container 22, heated by the pyrotechnic material 26, is directed through the opening 30 to inflate the air bag 34.

If the pressure of the gas in the chamber 24 in the inflator 20 drops below the predetermined pressure, the pressure on the outer surface 142 of the sensor portion 140 of the closure can 120 also drops below the predetermined pressure. The bias of the sensor portion 140 of the closure can 120 causes the sensor portion to move from the condition shown in FIGS. 2 and 3A to the condition shown in FIG. 3B. The sensor portion 140 pops upward from the plane of the ring portion 138 of the end wall 136 of the closure can 120, that is, in a direction away from the header 40 and into engagement with the end wall 210 of the contact can 200. The outer surface 142 of the sensor portion 140 of the closure can 120 engages the inner surface 212 of the end wall 210 of the contact can 200.

Figure 4:
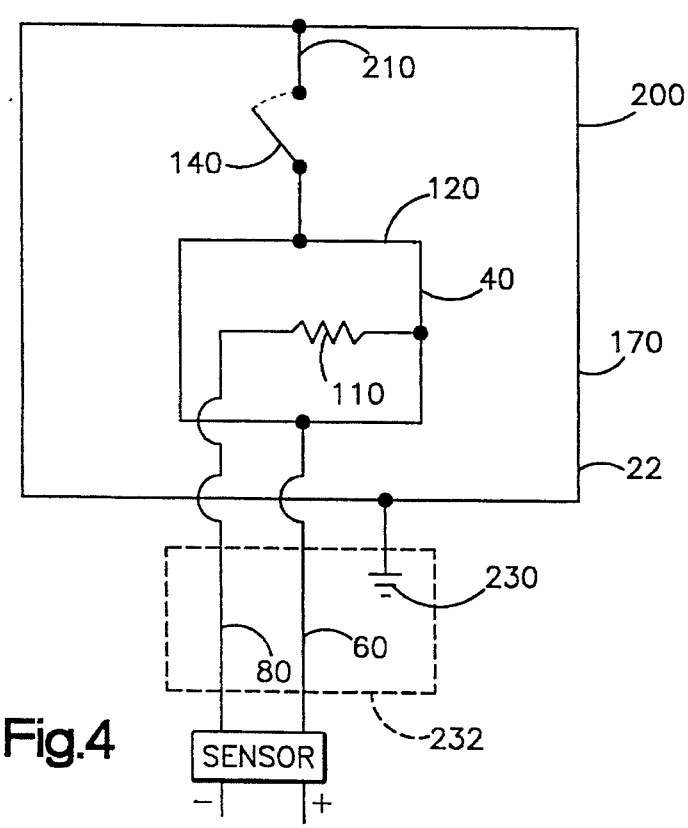
FIG. 4 is a simplified electrical schematic diagram of the initiator of FIG. 2.

The engagement of the sensor portion 140 of the closure can 120 with the end wall 210 of the contact can 200 completes an electric circuit between the first terminal 60 (FIGS. 2 and 4) and vehicle ground 230 (FIG. 4). The monitor circuit 232 indicates, by lighting the warning light (not shown) on the vehicle instrument panel, that the pressure in the chamber 24 in the inflator 20 is at a pressure below the predetermined pressure.

The monitor circuit 232 can also be used in a known manner to check the condition of the bridgewire 110. A small current, less than the current required to ignite the ignition charge 112, is passed between the terminals 60 and 80 and through the bridgewire 110. If the bridgewire 110 is intact, then a complete electrical circuit is present between the terminals 60 and 80. If the bridgewire 110 is broken, then an open circuit exists between the terminals 60 and 80. The monitor circuit 232, by checking for the presence of a complete electrical circuit between the terminals 60 and 80 and through the bridgewire 110, can determine the condition of the bridgewire. A fault such as an open bridgewire 110 can be indicated by lighting the same warning light as is used to indicate a pressure drop below the predetermined pressure in the chamber 24.

It is contemplated that the present invention may be embodied in other forms of initiators for sensing pressure in an air bag inflator. For example, an initiator such as the initiator 10 may include a member which is disposed adjacent to a movable portion of a container such as the burst disk 28. During assembly and pressurization of the inflator, the movable portion of the container is in engagement with the member until the pressure in the container reaches a predetermined pressure. The engagement of the member with the container portion completes an electric circuit through the initiator. When the pressure in the container reaches the predetermined pressure, the movable portion of the container moves out of engagement with the member due to the pressure of inflation fluid on the movable container portion. The disengagement of the movable container portion from the member opens the electric circuit in the initiator. If the pressure in the inflator drops below the predetermined pressure, the movable portion of the container moves into engagement with the member due to the change in pressure of inflation fluid on the container portion. The engagement of the member with the container portion completes the electric circuit through the initiator to actuate a warning light in the vehicle. Alternatively, a portion of the initiator may be movable like a piston, and movement of the burst disk due to pressure changes may result in movement of the initiator portion to open or close the electric circuit.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for inflating an inflatable vehicle occupant restraint, comprising:

a container defining a chamber;

inflation fluid in the chamber at a pressure at least as great as a predetermined pressure; and an electrically actuatable initiator connected with said container for, when actuated, causing said container to open to enable flow of inflation fluid into said inflatable vehicle occupant restraint to inflate said inflatable vehicle occupant restraint;

said initiator including pressure sensing means for sensing a decrease in the pressure in the chamber to a pressure below the predetermined pressure;

said initiator comprising an electrically conductive header supporting a pyrotechnic charge in said initiator, an inner cover electrically connected with said header and enclosing said pyrotechnic charge, and an outer cover disposed outward of and covering said inner cover, said pressure sensing means comprising said inner and outer covers.

2. An apparatus as set forth in claim 1 wherein said outer cover includes a wall portion exposed to the pressure of said inflation fluid and passage means extending through said wall portion for transmitting the pressure of said inflation fluid to said inner cover, said inner cover including a wall portion which is movable, in response to a decrease in the pressure in the chamber to a pressure below the predetermined pressure, into engagement with said wall portion of said outer cover to complete an electric circuit.

3. An apparatus as set forth in claim 2 wherein said outer cover is electrically grounded and said inner cover is electrically insulated from said outer cover.

4. An apparatus as set forth in claim 1 wherein said inner cover has a spherical segment movable relative to said outer cover from a first condition in which said spherical segment is spaced apart from said outer cover when the pressure in the chamber is at least as great as the predetermined pressure to a second condition in which said spherical segment is in engagement with said outer cover when the pressure in the chamber is below the predetermined pressure, said spherical segment having a center of curvature disposed on a first side of a reference plane when said spherical segment is in the first condition and having a center of curvature disposed on a second side of the reference plane opposite to said first side when said spherical segment is in the second condition.

5. An apparatus for inflating an inflatable vehicle occupant restraint, comprising:

a container defining a chamber;

inflation fluid in the chamber at a pressure at least as great as a predetermined pressure; and an electrically actuatable initiator connected with said container for, when actuated, causing said container to open to enable flow of inflation fluid into said inflatable vehicle occupant restraint to inflate said inflatable vehicle occupant restraint;

said initiator including:

an adaptor for connecting said initiator with said container;

at least one terminal for electrical connection with vehicle circuitry;

an electrically conductive header supporting said terminal in spaced relation to said adaptor;

a bridgewire associated with said terminal for, when electrically actuated by current from said terminal, generating thermal energy;

a pyrotechnic charge supported on said header and ignitable in response to generation of said thermal energy;

an electrically conductive closure can overlying said pyrotechnic charge, said closure can being electrically connected with said header;

an electrically conductive contact can electrically connected with said adaptor, said contact can overlying said closure can and being spaced apart from said closure can and being electrically insulated from said closure can; and pressure sensing means for sensing a decrease in the pressure in the chamber to a pressure below the predetermined pressure;

said pressure sensing means comprising a sensor portion of said closure can which is movable in response to a decrease in pressure in the chamber below the predetermined pressure into electrical contact with said contact can to complete an electric circuit including said terminal, said header, said closure can, said contact can, and said adaptor.

6. An apparatus for inflating an inflatable vehicle occupant restraint, comprising:

a container defining a chamber;

inflation fluid in the chamber at a pressure at least as great as a predetermined pressure; and pressure sensing means for sensing a decrease in the pressure in the chamber to a pressure below the predetermined pressure;

said pressure sensing means comprising an initiator connected with said container for, when actuated, causing said container to open to enable flow of inflation fluid into said inflatable vehicle occupant restraint to inflate said inflatable vehicle occupant restraint;

wherein said container is electrically conductive, said pressure sensing means including a movable member in said initiator which is electrically insulated from said container, said movable member being movable into engagement with a fixed member in said initiator which is electrically connected with said container to complete an electric circuit in response to a decrease in the pressure in the chamber to a pressure below the predetermined pressure; and wherein said movable member in said initiator comprises a movable portion of a cover enclosing a pyrotechnic charge in said initiator.

7. An apparatus for use in an inflator for inflating an inflatable vehicle occupant restraint which inflator includes (a) a container defining a chamber and (b) inflation fluid in the chamber at a pressure at least as great as a predetermined pressure, said apparatus comprising:

an electrically conductive first member electrically connectable with vehicle circuitry;

an electrically conductive second member electrically connectable with vehicle circuitry and being electrically insulated from said first member, said second member having a sensor portion disposed adjacent to said first member; and means for transmitting the pressure of said inflation fluid in the chamber to said sensor portion of said second member;

said sensor portion of said second member being movable relative to said first member from a first condition in which said sensor portion is spaced apart from said first member when the pressure in the chamber is at least as great as the predetermined pressure to a second condition in which said sensor portion is in engagement with said first member when the pressure in the chamber is below the predetermined pressure;

wherein said second member comprises an inner cover enclosing a pyrotechnic charge, said means for transmitting comprising an opening in an outer cover disposed outward of and covering said inner cover.

8. An apparatus as set forth in claim 7 wherein said sensor portion of said second member comprises a spherical segment of said second member having a center of curvature disposed on a first side of a reference plane when said sensor portion is in the first condition and having a center of curvature disposed on a second side of the reference plane opposite to said first side when said sensor portion is in the second condition.

9. An apparatus as set forth in claim 7 wherein the container is electrically conductive and said first member is electrically connected with the container, engagement of said sensor portion with said first member completing an electric circuit indicative of a decrease in the pressure in the chamber to a pressure below the predetermined pressure.

10. An apparatus as set forth in claim 7 wherein said initiator comprises an electrically conductive header supporting said pyrotechnic charge in said initiator, said inner cover being electrically connected with said header and enclosing said pyrotechnic charge.

11. An apparatus as set forth in claim 7 wherein said initiator includes:

an adaptor for connecting said initiator with said container;

at least one terminal for electrical connection with vehicle circuitry;

an electrically conductive header supporting said terminal in spaced relation to said adaptor;

a bridgewire associated with said terminal for, when electrically actuated by current from said terminal, generating thermal energy;

said pyrotechnic charge being supported on said header and being ignitable in response to generation of said thermal energy;

said inner cover comprising an electrically conductive closure can overlying said pyrotechnic charge, said closure can being electrically connected with said header;

said outer cover comprising an electrically conductive contact can electrically connected with said adaptor, said contact can overlying said closure can and being spaced apart from said closure can and being electrically insulated from said closure can;

said sensor portion of said closure can being movable into electrical contact with said contact can to complete an electric circuit including said terminal, said header, said closure can, said contact can, and said adaptor.

12. An apparatus for use in an inflator for inflating an inflatable vehicle occupant restraint which inflator includes (a) a container defining a chamber and (b) inflation fluid in the chamber at a pressure at least as great as a predetermined pressure, said apparatus comprising:

an electrically conductive first member electrically connectable with vehicle circuitry;

an electrically conductive second member electrically connectable with vehicle circuitry and being electrically insulated from said first member, said second member having a sensor portion disposed adjacent to said first member; and means for transmitting the pressure of said inflation fluid in the chamber to said sensor portion of said second member;

said sensor portion of said second member being movable relative to said first member from a first condition in which said sensor portion is spaced apart from said first member when the pressure in the chamber is at least as great as the predetermined pressure to a second condition in which said sensor portion is in engagement with said first member when the pressure in the chamber is below the predetermined pressure;

wherein said first member comprises an outer cover, said outer cover having a cylindrical side wall extending generally parallel to an axis of said apparatus, said outer cover having a radially extending circular end wall formed as one piece with said side wall, said second member comprising an inner cover enclosing a pyrotechnic charge in said apparatus, said inner cover having an axially extending cylindrical side wall spaced apart radially from said side wall of said outer cover, said inner cover having a radially extending circular end wall formed as one piece with said side wall and spaced apart axially from said end wall of said outer cover, said end wall of said inner cover having an annular generally planar ring portion extending radially inward from said side wall and parallel to said end wall of said outer cover, said sensor portion of said second member comprising a spherical segment of said end wall of said inner cover disposed radially inward of said ring portion and centered on said axis of said apparatus, said sensor portion being movable axially into engagement with said end wall of said outer cover in response to a decrease in the pressure in the chamber below the predetermined pressure.

13. An apparatus for inflating an inflatable vehicle occupant restraint, comprising:

a container defining a chamber;

inflation fluid in the chamber at a pressure at least as great as a predetermined pressure;

an electrically actuatable initiator connected with said container for, when actuated, causing said container to open to enable flow of inflation fluid into said inflatable vehicle occupant restraint to inflate said inflatable vehicle occupant restraint, said initiator comprising a pyrotechnic charge in said initiator and a member enclosing said pyrotechnic charge;

said initiator including pressure sensing means for sensing a decrease in the pressure in the chamber to a pressure below the predetermined pressure, said pressure sensing means comprising a movable portion of said initiator which is movable to complete an electric circuit in response to a decrease in the pressure in the chamber to a pressure below the predetermined pressure; and said apparatus further comprising a second body of pyrotechnic material which is disposed in said chamber at a location outside of said member, said second body of pyrotechnic material being ignitable by said pyrotechnic charge in said initiator to heat and to increase the pressure of said inflation fluid in said chamber.

14. An apparatus as set forth in claim 13 wherein said initiator further comprises a bridgewire for, when electrically actuated, generating thermal energy, said bridgewire being associated with said pyrotechnic charge in said initiator, said pyrotechnic charge in said initiator being ignitable in response to generation of said thermal energy by said bridgewire.

15. An apparatus as set forth in claim 13 wherein said member comprises an electrically conductive cover through which electric current flows upon completion of said electric circuit in response to a decrease in the pressure in the chamber to a pressure below the predetermined pressure.

16. An apparatus as set forth in claim 15 wherein said cover comprises an outer cover of said initiator which includes an opening in said outer cover for transmitting the pressure of said inflation fluid in the chamber to said movable portion of said initiator.

17. An apparatus as set forth in claim 15 wherein said cover comprises an inner cover in abutting engagement with said pyrotechnic charge in said initiator, said inner cover including said portion of said initiator which is movable to complete an electric circuit in response to a decrease in the pressure in the chamber to a pressure below the predetermined pressure.

18. An apparatus as set forth in claim 17 wherein said initiator further comprises an outer cover of said initiator which includes an opening in said outer cover for transmitting the pressure of said inflation fluid in the chamber to said movable portion of said inner cover.

19. An apparatus for inflating an inflatable vehicle occupant restraint, comprising:

a container defining a chamber;

inflation fluid in the chamber at a pressure at least as great as a predetermined pressure;

an electrically actuatable initiator connected with said container for, when actuated, causing said container to open to enable flow of inflation fluid into said inflatable vehicle occupant restraint to inflate said inflatable vehicle occupant restraint;

said initiator including a pyrotechnic charge and an electric heating element for igniting said pyrotechnic charge;

said initiator further including a pair of electrical contacts for sensing a decrease in the pressure in the chamber to a pressure below the predetermined pressure;

said apparatus further comprising means for electrically connecting said electric heating element and said electrical contacts with vehicle electric circuitry, said means for electrically connecting comprising a ground connection and first and second terminal wires which are electrically insulated from said ground connection, electric current flowing between said first and second terminal wires to flow across said electric heating element upon actuation of said initiator;

insulation means in said initiator for electrically insulating said electric heating element from said ground connection; and said apparatus further comprising monitor circuitry for monitoring the condition of said pair of electrical contacts to indicate a decrease in the pressure in the chamber to a pressure below the predetermined pressure;

said first terminal wire and said ground connection electrically connecting said pair of electrical contacts with said monitor circuitry and conducting electric current across said pair of electrical contacts.

20. An apparatus as set forth in claim 19 wherein said initiator including said electrical contacts extends into the chamber in said container through a single opening in said container and is welded to said container with a single weld.

21. An apparatus as set forth in claim 19 further comprising a second body of pyrotechnic material which is disposed in said chamber at a location outside of said initiator, said second body of pyrotechnic material being ignitable by said pyrotechnic charge in said initiator to heat and to increase the pressure of said inflation fluid in said chamber.

22. An apparatus as set forth in claim 19 wherein said initiator comprises an electrically conductive cover through which electric current flows upon completion of an electric circuit in response to a decrease in the pressure in the chamber to a pressure below the predetermined pressure.

23. An apparatus as set forth in claim 22 wherein said cover comprises an inner cover in abutting engagement with said pyrotechnic charge in said initiator, said inner cover including one of said electrical contacts which is movable to complete an electric circuit in response to a decrease in the pressure in the chamber to a pressure below the predetermined pressure.

* * * * *